(12) United States Patent
Kuckuck et al.

(10) Patent No.: US 8,846,780 B2
(45) Date of Patent: Sep. 30, 2014

(54) FRICTION ELEMENT FOR SYNCHRONIZING DEVICE

(75) Inventors: Constanze Kuckuck, Fuerth (DE); Stefan Steinmetz, Essingen (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 117 days.

(21) Appl. No.: 13/525,474

(22) Filed: Jun. 18, 2012

(65) Prior Publication Data

US 2012/0264850 A1 Oct. 18, 2012

Related U.S. Application Data

(63) Continuation of application No. PCT/DE2010/001449, filed on Dec. 9, 2010.

(30) Foreign Application Priority Data

Dec. 17, 2009 (DE) .......................... 10 2009 058 693

(51) Int. Cl.
*F16D 69/02* (2006.01)
*F16D 23/02* (2006.01)

(52) U.S. Cl.
CPC ...... *F16D 69/026* (2013.01); *F16D 2200/0065* (2013.01); *F16D 23/025* (2013.01); *F16D 2250/00* (2013.01)

USPC ........... 523/156; 523/152; 523/155; 523/157; 523/158

(58) Field of Classification Search
CPC ...................... F16D 69/026; F16D 2200/0065
USPC .......................... 523/152, 155, 156, 157, 158
See application file for complete search history.

(56) References Cited

U.S. PATENT DOCUMENTS

| | | | | |
|---|---|---|---|---|
| 6,326,742 | B1 * | 12/2001 | Iwasaki et al. | 315/370 |
| 7,326,742 | B2 * | 2/2008 | Kawabata et al. | 524/31 |
| 8,222,317 | B2 * | 7/2012 | Kozutsumi | 523/149 |
| 2003/0029332 | A1 | 2/2003 | Matsuzuki et al. | |
| 2005/0014862 | A1 | 1/2005 | Kusaka et al. | |
| 2009/0139808 | A1 | 6/2009 | Bouchard et al. | |

FOREIGN PATENT DOCUMENTS

| | | |
|---|---|---|
| DE | 100 35 489 A1 | 1/2002 |
| DE | 10 2004 060 016 A1 | 6/2006 |
| DE | 10 2006 057 486 A1 | 6/2008 |
| DE | 10 2006 061 414 A1 | 6/2008 |
| EP | 1 394 438 A1 | 3/2004 |
| WO | 2005/070648 A1 | 8/2005 |
| WO | WO 2009057414 A1 * | 5/2009 |

* cited by examiner

*Primary Examiner* — Vickey Nerangis
(74) *Attorney, Agent, or Firm* — Lucas & Mercanti, LLP

(57) ABSTRACT

A friction element for a synchronizing device as well as an apparatus for producing a friction element for a synchronizing device are disclosed.

2 Claims, 4 Drawing Sheets

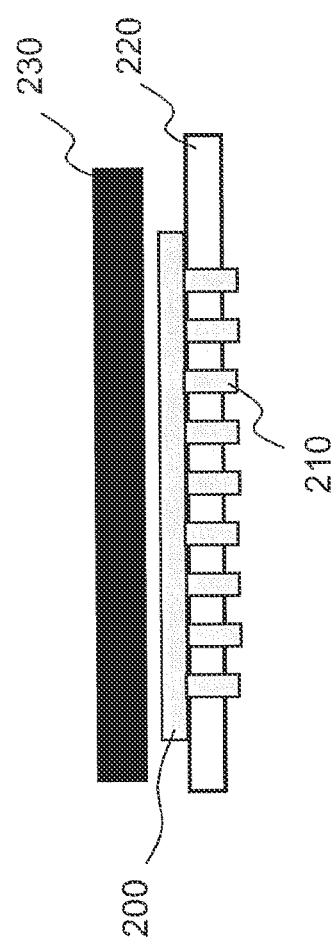

FRICTION ELEMENT FOR SYNCHRONIZING DEVICE

CROSS-REFERENCE TO RELATED APPLICATIONS

This application is a continuation of PCT/EP2010/001449 filed Dec. 9, 2010, which in turn claims the priority of DE 10 2009 058 693.8 filed Dec. 17, 2009. The priority of both applications is hereby claimed and both applications are incorporated by reference herein.

FIELD OF THE INVENTION

The invention relates to friction elements and an apparatus for producing a friction element.

BACKGROUND OF THE INVENTION

According to the current prior art, synchronizer rings, which are employed in synchronizing devices of sliding clutch transmissions, for example, made of nonferrous metal are used or rings made of base metals are used, which are coated with or glued to various materials, for example, carbon fiber plates or sintered or sprayed materials such as molybdenum coatings as is disclosed in DE 10 2006 057 486 A1, DE 10 2004 060 016 A1, and DE 100 35 489 A1.

The existing systems have the disadvantage that, e.g., molybdenum coatings tend to be eaten away in the event of high contact pressure threes and sliding speeds, since, although the oil is displaced well from the friction contact, due to the lack of porosity and the lack of springback of the layer resulting therefrom (sponge effect), no new oil can flow in to prevent the eating away.

Carbon materials are, on the one hand, very costly and, on the other hand, the application to greatly varying synchronizer ring geometries is difficult, since a resulting adhesive joint can act as a flaw, at which the covering easily detaches and which can consequently result in comfort problems. In addition, complex application tools are necessary.

A friction material which is also for use in synchronizing devices is disclosed by DE 10 2006 061 414 A1, wherein complete synchronizer rings are no longer used as the friction material, but rather friction lining elements, referred to in the scope of this publication as friction elements or friction lining pads or pads or friction pads, are arranged in a synchronizer ring with recesses wherein the friction lining pads are arranged in the recesses. The synchronizer ring functions as a carrier or cage in this case. All applications are to be operated using such friction pad systems (FPS) in this manner.

SUMMARY OF THE INVENTION

The invention is based on the object of developing a friction material for the friction pad system which has good comfort properties.

The object is achieved by friction elements that have features which will be described below and by an apparatus for producing a friction element that has features which will also be described below.

According to the invention, a friction element for a synchronizing device is proposed, wherein the composition of the friction element contains the following:
  0-25% friction dust,
  5-45% phenol resin unmodified or modified using cashew shell oil or NBR rubber,
  1-25% organic natural fibers,
  1-25% organic synthetic fibers,
  1-45% barium sulfate,
  1-50% Celite,
  1-30% metal fibers or metal powder,
  0-15% SiC,
  0-15% chromium oxide.

In a preferred embodiment, the composition of the friction element contains the following:
  5-15% friction dust,
  15-25% phenol resin modified using cashew shell oil,
  1-10% hemp fibers,
  1-10% PAN fibers,
  5-15% barite,
  35-45% Celite,
  5-15% copper chips, In a particularly preferred embodiment, the composition of the friction element contains the following:
  10% friction dust,
  20% phenol resin modified using cashew shell oil,
  5% hemp fibers,
  5% PAN fibers,
  10% barite,
  40% Celite,
  10% copper chips.

A further friction element for a synchronizing device is proposed as an alternative according to the invention, wherein the composition of this friction element contains the following:
  1-25% friction dust,
  5-45% phenol resin unmodified or modified using cashew shell oil or NBR rubber,
  1-25% inorganic fibers,
  1-25% carbon fibers,
  1-50% Celite and/or coconut shell flour,
  1-30% metal fibers or metal powder,
  1-25% organic natural fibers,
  0-15% SiC,
  0-15% chromium oxide.

In a preferred embodiment of this friction element, the composition of this friction element contains the following:
  1-10% friction dust,
  15-25% phenol resin modified using cashew shell oil,
  5-15% rock wool without shot fraction,
  5-15% carbon fibers,
  15-25% Celite,
  15-25% coconut shell flour,
  1-10% copper fibers,
  5-15% cotton fibers.

In a particularly preferred embodiment of this friction element, the composition of this friction element contains the following:
  5% friction dust,
  20% phenol resin modified using cashew shell oil,
  10% rock wool without shot fraction,
  10% carbon fibers,
  20% Celite,
  20% coconut shell flour,
  5% copper fibers,
  10% cotton fibers.

A farther friction element for a synchronizing device is proposed as an alternative according to the invention, wherein the composition of this friction element contains the following:
  50-90% copper powder or aluminum powder or bronze powder or other nonferrous metals, each in grain sizes of 50 μm to 1500 μm,
  10-50% phenol resin.
  wherein the mass fraction of the metal to the mass fraction of the phenol resin is in a ratio from 90 to 10 up to 50 to 50.

In a preferred embodiment, the composition of the friction element contains the following:
70-90% copper powder,
10-30% phenol resin.

In a particularly preferred embodiment, the composition of the friction element contains the following:
80% copper powder,
20% phenol resin.

In a preferred embodiment, the copper powder contains alloy additives and the copper powder has a grain size of 400-600 μm.

In a particularly preferred embodiment, the copper powder contains alloy additives and the copper powder has a grain size of 500 μm.

In a further preferred embodiment, the composition of the friction element contains the following:
70-90% aluminum shot,
10-30% phenol resin.

In a further particularly preferred embodiment, the composition of the friction element contains the following:
80% aluminum shot,
20% phenol resin.

In a preferred embodiment, the aluminum shot contains alloy additives and the aluminum shot has a grain size of 900-1100 μm.

In a particularly preferred embodiment, the aluminum shot contains alloy additives and the aluminum shot has a grain size of 1000 μm.

In a further preferred embodiment, the composition of the friction element contains the following:
70-90% bronze powder,
10-30% phenol resin.

In a further particularly preferred embodiment, the composition of the friction element contains the following:
80% bronze powder,
20% phenol resin.

In a preferred embodiment, the bronze powder contains alloy additives and the bronze powder has a grain size of 600-800 μm.

In a particularly preferred embodiment, the bronze powder contains alloy additives and the bronze powder has a grain size of 700 μm.

The proposed friction elements have the following properties in an advantageous manner: The material is resistant to transmission oil, achieves a coefficient of friction of 0.1 in the standard tests in relation to untreated steel in transmission oil, and maintains this coefficient of friction at a surface pressure of up to 20 N/mm$^2$ and a sliding speed of 11 m/s consistently over the lifetime. A continuous temperature resistance of 150° C. and a short-term temperature resistance of up to 400° C. are also ensured. In addition, good comfort properties are provided.

An apparatus for producing a friction element that has a compression device and a molding plate that has recesses is also proposed according to the invention. Friction material is pressed into the recess by the compression device so that the shape of the friction elements is determined by the shape of the recesses in the molding plate.

In a preferred embodiment, the recesses are open on both sides of the molding plate (30).

In a further preferred embodiment, the molding plate has a bottom plate on a first side. The molding plate and bottom plate lie on one another during the compression procedure in such a manner that they do not move in relation to one another.

In a further preferred embodiment, the bottom plate has ejector pins, which can penetrate into the recesses in the molding plate and leave them again, in order to allow ejection of the friction elements after the compression procedure.

In a further preferred embodiment, the compression apparatus has a compression ram and the molding plate has a metering plate on a second side opposite to the first side. The molding plate and metering plate lie on one another during the compression procedure in such a manner that they do not move in relation to one another.

In a further preferred embodiment, the metering plate has a recess, which is open toward the molding plate and into which the compression ram can penetrate.

Further advantages and advantageous embodiments of the invention are the subject matter of the following figures and their description.

BRIEF DESCRIPTION OF THE DRAWINGS

In the figures:
FIG. 4 shows a schematic view of a grinding apparatus for isolating the pads.

DETAILED DESCRIPTION OF THE DRAWINGS

Multiple formulas for producing friction lining pads are specified hereafter. The percentage specifications specified in the formulas are mass-percent in relation to dry mass, i.e., to the finished friction material product provided after the production process.

The components of a formula are mixed with one another in a mixer and subsequently supplied in powder form to the apparatus according to the invention for production, which is described hereafter.

The following composition is provided according to a first formula designated friction material of type 1:
0-25% friction dust, 5-45% phenol resin unmodified or modified using cashew shell oil or NBR (nitrile butadiene rubber), 1-25% organic natural fibers, 1-25% organic synthetic fibers, 1-45% barium sulfate, 1-50% Celite, 1-30% metal fibers or metal powder, 0-15% SiC, 0-15% chromium oxide.

Friction dust is hardened, ground phenol resin:
The following percentages are advantageous in particular for the friction material of type 1:
10% friction dust, 20% phenol resin modified using cashew shell oil, 5% hemp fibers, 5% PAN fibers, 10% barite, 40% Celite, 10% copper chips.

The following composition is provided according to a second formula—designated friction material of type 2:
1-25% friction dust, 5-45% phenol resin unmodified or modified using cashew shell oil or NBR (nitrile butadiene rubber), 1-25% inorganic fibers, 1-25% carbon fibers, 1-50% Celite and/or coconut shell flour, 1-30% metal fibers or metal powder, 1-25% organic natural fibers, 0-15% SiC, 0-15% chromium oxide.

The following percentages are advantageous in particular for the friction material of type 2:
5% friction dust, 20% phenol resin modified using cashew shell oil, 10% rock wool without shot fraction, 10% carbon fibers, 20% Celite, 20% coconut shell flour, 5% copper fibers, 10% cotton fibers.

The following composition is provided according to a third formula—designated friction material of type 3:

Copper powder or aluminum powder or bronze powder or other nonferrous metals, each in grain sizes from 50 μm to 1500 μm, and phenol resin in the ratio of metal to phenol resin of 90:10 to 50:50.

The following three formulas are advantageous in particular for the friction material of type 3:

80% copper powder (500 μm grain size, alloy additives are zinc, aluminum, molybdenum, titanium, tin) with 20% phenol resin, 80% aluminum shot (1000 μm grain size) with 20% phenol resin, 80% bronze (alloy additives are, in addition to copper and tin also zinc, nickel, molybdenum, graphite, silicon dioxide; grain size 700 μm) with 20% phenol resin.

Figure 1:
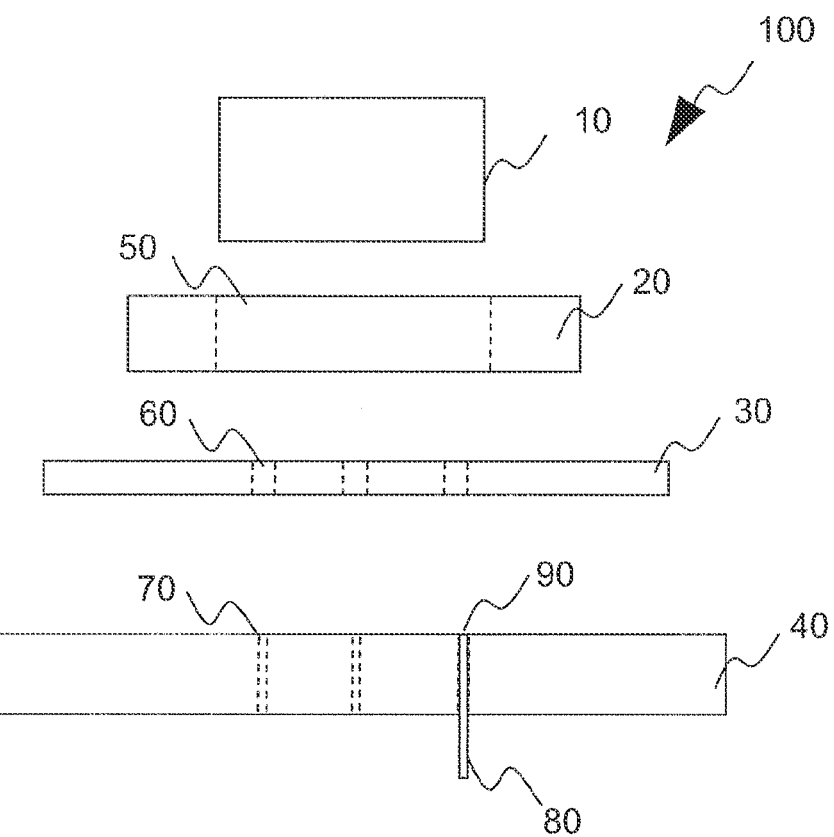
FIG. 1 shows a schematic view of the apparatus for producing pads.

By means of a special apparatus, which is schematically shown in FIG. 1, it is possible to produce individual friction lining pads in greater quantities. The method for producing pads and the apparatus and the function of the apparatus are explained hereafter on the basis of FIG. 1.

Figure 2:
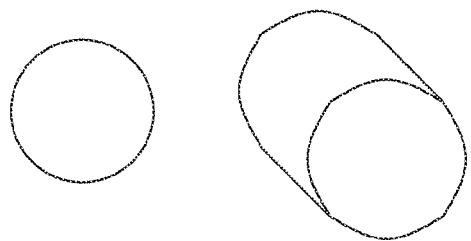
FIG. 2 shows examples of several shapes which the pads can have after the production by means of the apparatus.
Figure 2:
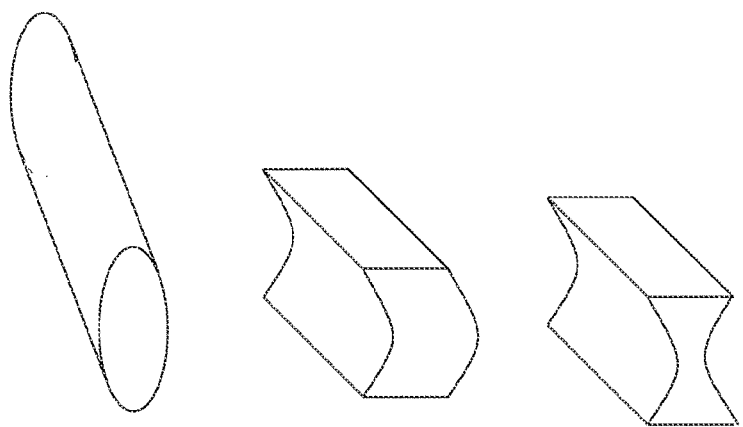
Figure 2:
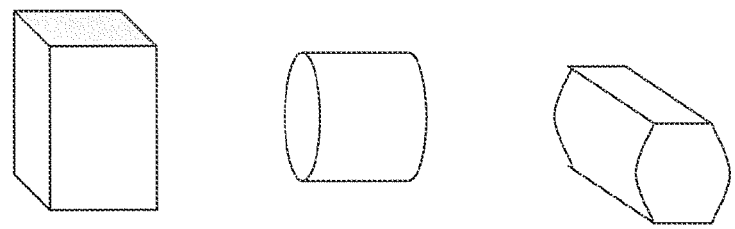
Figure 3:
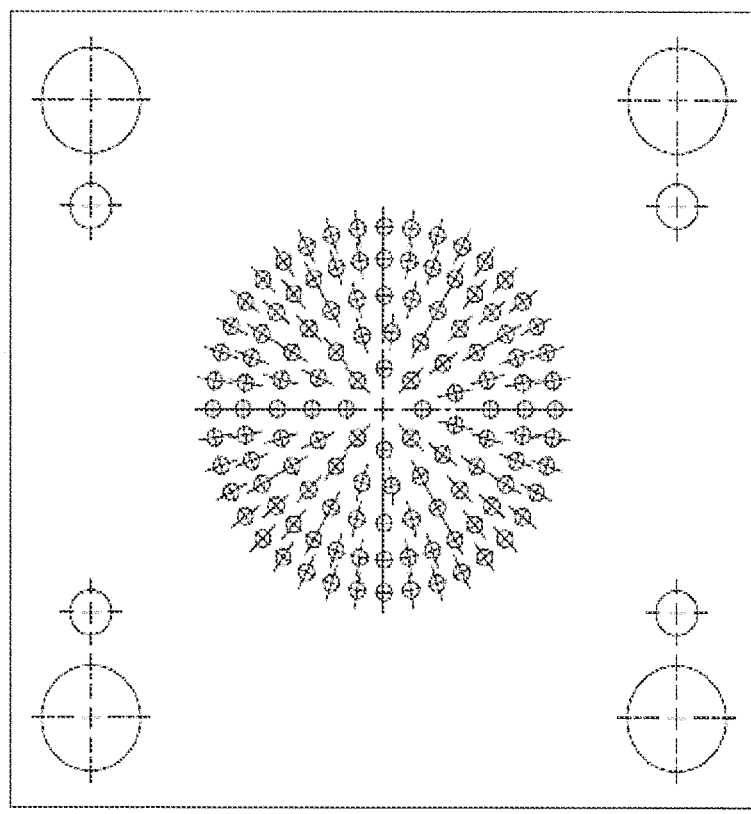
FIG. 3 shows a schematic view of an example of a molding plate.

The production of the pads is performed using the apparatus 100, which represents a compact compression tool. The apparatus comprises a molding plate 30, in which cavities 60 arranged in the form of a circle are incorporated, for example, which determine the geometry of the resulting pads. Such cavities 60 represent recesses in the molding plate 30 and are open toward the bottom side and toward the top side of the molding plate 30. Examples of possible shapes of the resulting pads are shown in FIG. 2. An example of a molding plate 30 is shown in FIG. 3. The molding plate 30 is fastened on a bottom plate 40 having individual ejector pins 80, for example, one ejector pin 80 but also multiple ejector pins can be provided per cavity 60, or the plates are pressed against one another by pressure. The bottom plate forms a plane with the front faces 90 of the non-extended ejector pins 80, which are countersunk in the bottom plate 40 in this state. The ejector pins 80 are only extended for ejection and the front faces of the ejector pins leave the plane of the bottom plate. A metering plate 20 is attached over the molding plate 30 in the recess 50 thereof, which is cylindrical, for example, the powdered friction material is metered onto the region of the molding plate 30 having the cavities 60, which region is exposed by the cylindrical recess 50 of the metering plate 20. The bottom plate 40 terminates the cavities 60 on the bottom. During the metering and compression procedure, metering plate 20, molding plate 30, and bottom plate 40 lie on one another in such a manner that they do not move in relation to one another. During the compression procedure, the smooth ram 10 plunges into the recess 50 of the metering plate 20 and forces the friction material, through pressure and temperature control of the tool, to flow into the cavities 60 of the molding plate 30. 10 to 50 MPa, preferably approximately 20 MPa are applied as the pressure, the temperature is from 100 to 280°, preferably 160°. Ventilation is provided in conjunction with the compression.

All individual parts of the apparatus 100, in particular the molding plate 30, are individually exchangeable and modifiable. It is therefore possible to compress greatly varying geometries using the same tool, by simply changing the molding plate.

After the compression procedure, which only lasts a few seconds, the individual pads are ejected and suctioned off through an internally profiled hose, wherein resulting compression burrs are removed. The pads are subsequently cured loose in a furnace and are then dimensionally accurate without further additional mechanical processing.

An alternative solution is to meter in more friction material than is required for the pads. A plate 200 thus results at the upper end of the pads 210 upon compression, which connects the pads to one another. In a subsequent step, as shown in FIG. 4, this plate 200 including the pads 210 connected thereto can be laid in a guide plate 220, which is then moved through a grinding machine, wherein a grinding disk 230 removes the plate 200 and thus isolates the lining pads 210. The guide plate 220 carries the plate 200 together with the pads 210 connected thereto and has recesses for the pads 210, which do not hold the pads, however, so that they can fall out of the recesses after the plate 200 is ground off, A spacer can be provided between guide plate 220 and plate 200, so that the grinding disk 230 does not damage the guide plate 220 during the grinding of the plate 200. A furnace cycle is then also necessary to cure the friction lining pads 210.

If necessary, a post-treatment can be performed, whereby, for example, grooves are introduced at the desired points of the pads 210. Such grooves on the pads can also be provided by the design of the cavities 60, however, so that this type of post-treatment becomes unnecessary.

The friction lining pads can be compressed in all conceivable geometries, i.e., shapes, in simple cuboids, in rectangular shapes having chamfers and radii, i.e. rounded areas, or in a round design. Several exemplary geometries are shown in FIG. 2. The geometry is adaptable to the conditions of the respective application. The comfort behavior of the friction pair can be optimized in this manner. Diverse grooves can also be introduced into the friction lining pads, as already mentioned, so that an optimal oil displacement can occur via geometry and grooving and a high coefficient of friction can thus be built up very rapidly, to ensure rapid synchronization.

The invention comprises the production of a friction material for use in the synchronizing devices.

The friction material is to be made variable in its form, since the friction pad system permits many degrees of freedom. The material can be produced as a mixture containing metal particles and phenol resin in the greatly varying geometries. The apparatus for production is also designed variably, so that materials having different behavior can be compressed using a single tool and different geometries can also be represented by a simple replacement of the molding plate.

LIST OF REFERENCE NUMERALS

10 Ram
20 Metering Plate
30 Molding Plate
40 Bottom Plate
50 Recess
60 Cavity
70 Recess for Ejector Pin
80 Ejector Pin
90 Front Face of an Ejector Pin
100 Compression Tool
200 Plate
210 Pad
220 Guide Plate
230 Grinding Disk

The invention claimed is:

1. A friction element for a synchronizing device, wherein the composition of the friction element contains the following:
   5-15% friction dust;
   15-25% phenol resin modified using cashew shell oil;
   1-10% hemp fibers;
   1-10% PAN fibers;

5-15% barite;
35-45% diatomaceous earth; and
5-15% copper chips.

2. A friction element for a synchronizing device, wherein the composition of the friction element contains the following:
1-10% friction dust;
15-25% phenol resin modified using cashew shell oil;
5-15% rock wool;
5-15% carbon fibers;
15-25% diatomaceous earth;
15-25% coconut shell flour;
1-10% copper fibers; and
5-15% cotton fibers.

* * * * *